(12) United States Patent
Doane

(10) Patent No.: US 6,819,982 B2
(45) Date of Patent: Nov. 16, 2004

(54) UNINHABITED AIRBORNE VEHICLE IN-FLIGHT REFUELING SYSTEM

(75) Inventor: Paul M. Doane, Balwin, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/304,626

(22) Filed: Nov. 26, 2002

(65) Prior Publication Data

US 2004/0102876 A1 May 27, 2004

(51) Int. Cl.$^7$ .......................... G08G 5/04; G01C 21/28
(52) U.S. Cl. ............................ 701/3; 701/9; 701/300; 701/301; 244/135 A; 340/961
(58) Field of Search ............................ 701/3, 4, 9, 10, 701/14, 300, 301; 244/135 A, 195, 17.13; 340/903, 945, 958, 961, 979, 435, 436

(56) References Cited

U.S. PATENT DOCUMENTS

| | | | | |
|---|---|---|---|---|
| 5,530,650 A | * | 6/1996 | Biferno et al. | 701/300 |
| 5,904,729 A | * | 5/1999 | Ruzicka | 701/300 |
| 5,906,336 A | * | 5/1999 | Eckstein | 244/135 A |
| 5,933,099 A | * | 8/1999 | Mahon | 340/961 |
| 6,498,968 B1 | * | 12/2002 | Bush | 701/3 |
| 6,540,179 B2 | * | 4/2003 | Henderson | 244/135 A |
| 2003/0038214 A1 | * | 2/2003 | Bartov | 244/135 A |
| 2003/0110028 A1 | * | 6/2003 | Bush | 704/231 |
| 2003/0136874 A1 | * | 7/2003 | Gjerdrum | 244/10 |

FOREIGN PATENT DOCUMENTS

GB       2237251 A  *  5/1991

* cited by examiner

Primary Examiner—Tan Q. Nguyen
(74) Attorney, Agent, or Firm—Black Lowe & Graham PLLC

(57) ABSTRACT

A method and system is provided for performing automated air refueling of uninhabited airborne vehicles (UAVs). The method and system includes any combination of a positioning system component, an air collision avoidance system (ACAS) component, a voice processing component, an image processing component, a flight controller, a wireless data link connecting the UAV with the tanker, and refueling components. The ACAS component receives position information of other aircraft, such as UAVs and tankers, over the wireless data link, and generates navigation instructions based on the received position information, and sends the generated navigation instructions to the flight controller. The refueling components include sensors that determine the status of the refueling components. Refueling of the UAV is based on the determined status.

20 Claims, 5 Drawing Sheets

UNINHABITED AIRBORNE VEHICLE IN-FLIGHT REFUELING SYSTEM

FIELD OF THE INVENTION

This invention relates generally to aircraft refueling and, more specifically, to uninhabited airborne vehicle refueling.

BACKGROUND OF THE INVENTION

Uninhabited airborne vehicles (UAVs) are becoming widely used by the U.S. Navy and Air Force. Current UAV applications include surveillance, ground attack, and air interdiction. However, further expansion of UAV applications is hindered because, unlike piloted aircraft, they cannot be refueled during flight. Consequently, UAVs cannot perform applications requiring long ranges, such as deep strike interdiction, or long duration surveillance. UAVs also cannot be transported under their own power to remote locations, such as across oceans, because of their range limitations. Instead, UAVs must be flown across oceans in transport aircraft, which is expensive and ties up valuable resources needed for transporting other equipment. Because of these reasons, there exists a need to refuel UAVs in-flight. Because no UAV in-flight refueling system is currently known to exist, there is an unmet need in the art for a UAV in-flight refueling system.

SUMMARY OF THE INVENTION

The present invention provides automated air refueling (AAR) of uninhabited airborne vehicles (UAVs). According to an embodiment of the invention, a UAV AAR system includes any combination of a positioning system component, an air collision avoidance system (ACAS) component, a voice processing component, an image processing component, a flight controller, a wireless data link, refueling components, and a ground operation station. The voice processing component may be replaced by a wireless voice link to a human operator at the ground operation station using, such as, but not limited to, a satellite communications link. The positioning system component determines the absolute (longitude, latitude, altitude) location of the UAV. A similar system on the tanker determines the absolute position of the tanker, which is transmitted to the UAV over the wireless data link. The absolute position of the UAV and tanker is provided to the flight controller, which determines the relative position (azimuth, elevation, range) of the UAV relative to the tanker, and generates navigation instructions to guide the UAV into the proper position relative to the tanker such that the tanker can connect with the UAV to transfer fuel. The ACAS component also receives the absolute positions of the UAV, as well as the tanker and any other aircraft around the UAV via the wireless data link. The ACAS component also computes the relative position of the UAV relative to the tanker and other aircraft in the vicinity. The ACAS component uses that information to allow the UAV to avoid collisions with the tanker or other aircraft in the vicinity of the UAV. In the event the UAV is headed towards a collision with another aircraft, the ACAS component generates navigation instructions based on the relative position information, and sends the generated navigation instructions to the flight controller to safely fly the UAV away from the collision.

The voice processing component receives voice instructions over a voice communications channel, analyzes the received voice instructions, transmits a response according to autonomous analysis, generates navigation instructions according to the analysis, and sends the generated navigation instructions to the flight controller. The voice processing component transmits a response based on the sensed one or more conditions of the refueling components.

As an alternative, the voice processing component is replaced by a wireless voice link to a human operator at the ground operation station. For the purposes of simplification, the present invention assumes that voice processing component is used in the refueling operation, although either approach is included in this application.

The image processing component includes one or more digital cameras for generating one or more digital images, a memory, and an image processor. The image processor compares the generated one or more digital images to one or more comparable images stored in the image processing component's memory to determine the position of the UAV relative to the tanker. The relative position information is sent to the flight controller, which compares the relative position information with that generated from the data sent by the positioning system. If the two relative position calculations are consistent, the flight controller generates navigation instructions to guide the UAV into position for refueling.

Should either the image processing component or the positioning component fail during the refueling operation, the refueling can be completed using other components. When both components are operational, they provide a safety check against errors or failures in either system. Embodiments of this invention using only one of these components are covered in this invention.

BRIEF DESCRIPTION OF THE DRAWINGS

The preferred and alternative embodiments of the present invention are described in detail below with reference to the following drawings.

DETAILED DESCRIPTION OF THE INVENTION

Figure 1:
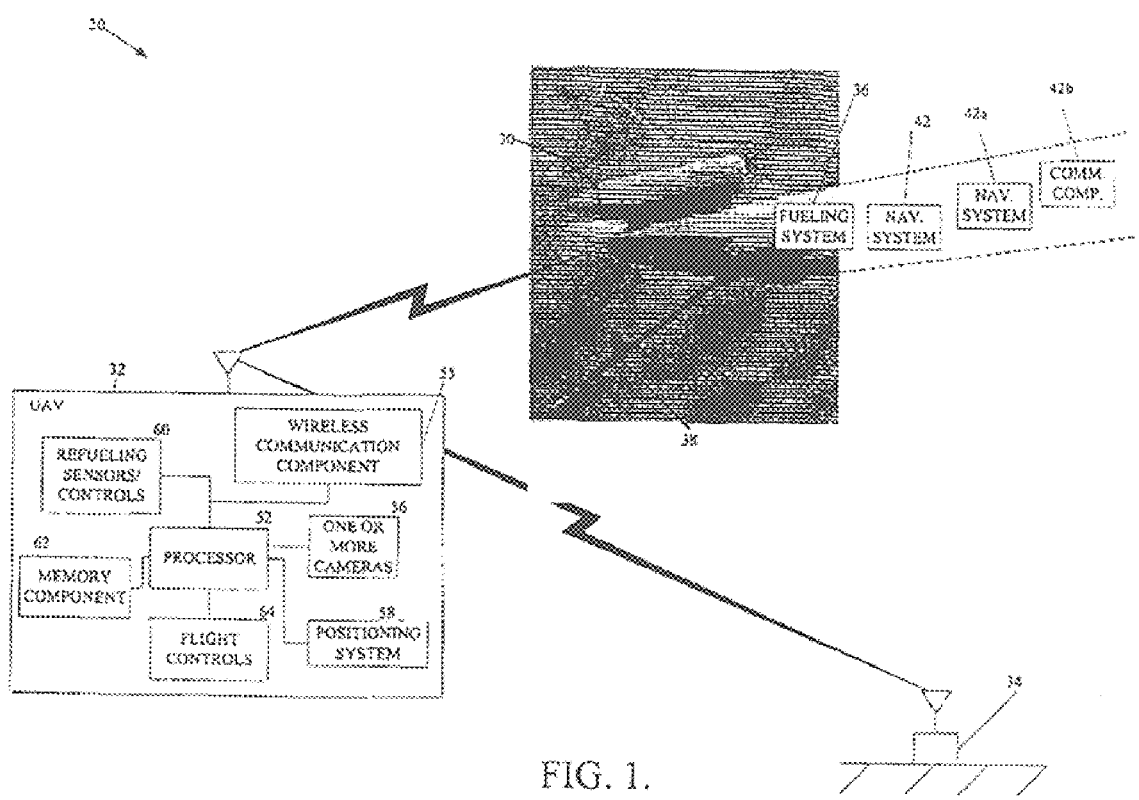
FIG. 1 illustrates the components of an automatic air refueling system for uninhabited airborne vehicle (UAV) formed in accordance with the present invention.

FIG. 1 illustrates a system 20 for performing automatic air refueling evolutions for uninhabited air vehicles (UAV) 32, such as, without limitation, US Navy and Air Force UAVs. The system 20 includes one or more refueling aircraft (tanker) 30, one or more UAVs 32, and one or more ground operation stations 34. The tanker 30 includes a navigation system 42, a positioning system 42a such as without limitation a global positioning system (GPS), a wireless data communication component 42b, and a fueling system 36 with a boom 38. The fueling system 36 includes components for allowing a boom operator to control the boom 38 during aircraft fueling operations and to send voice commands to a UAV 32 via radio communication (alternatively to the ground operation station operator). The positioning system 42a provides the absolute location of the tanker 30 to the UAV 32 via the wireless data communication component 42b. The wireless data communication component 42b allows the tanker to send and receive information to and from UAVs 32.

Each UAV 32 includes a processor 52, one or more digital cameras 56, a positioning system 58, such as without limitation a global positioning system (GPS), refueling sensors and controls 60, a suitable memory component 62, a wireless data communication component 55 that communicates (wireless data link) with the wireless data communication component 42b of the tanker 30, and flight controls 64. The ground operation station 34 includes voice and data communication components (not shown) for allowing communication with the tanker 30 and the UAVs 32.

Figure 2:
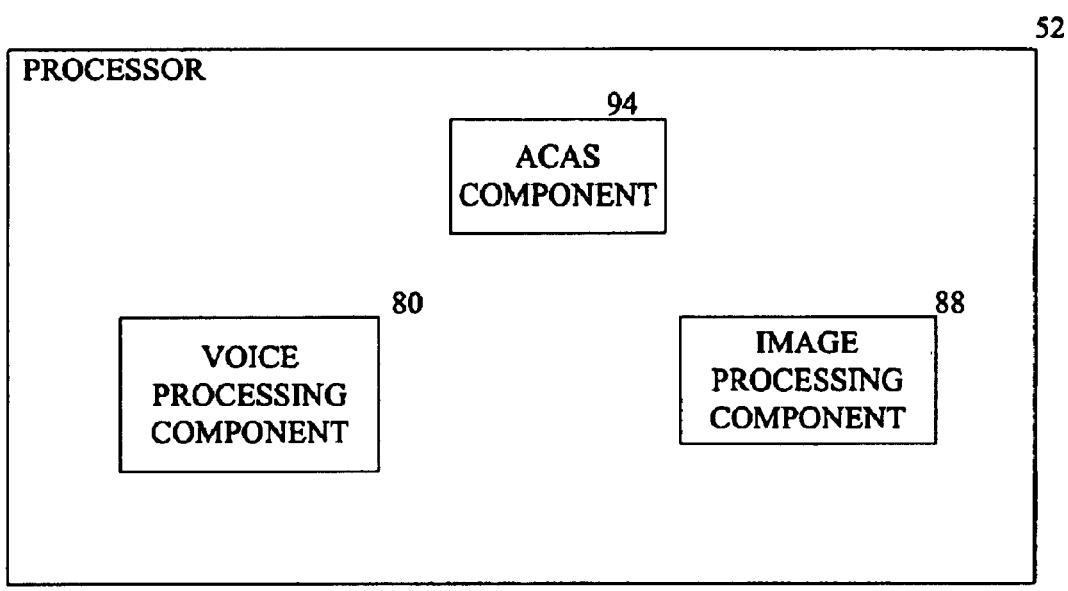
FIG. 2 illustrates processing components included within a processor of the UAV.

FIG. 2 illustrates some of the processing components included within the processor 52 of a UAV 32. The processor 52 includes a voice processing component 80, an image-processing component 88, and an air collision avoidance system (ACAS) component 94. The voice processing component 80 performs voice recognition processing of voice signals received from the tanker 30 or the ground operation station 34, and sends any necessary voice replies to the tanker 30 or the ground operation station 34. A non-limiting example of the voice processing component 80 is the ability of the UAV to understand and act upon voice commands from the tanker operator, such as "Breakaway, Breakaway". Inherent in the invention is synergistic uses of these components such as using the ACAS component to protect the UAV from acting upon unsafe voice commands from the tanker operator. The voice processor component 80 can be located on the tanker 30.

The image processing component 88 analyzes digital images generated by the one or more digital cameras 56 to determine aircraft position relative to the tanker 30. The UAV 32 receives from the tanker 30 a tanker identification code using the data communication component 55. The imaging processing component 88 suitably compares the digital images received from the digital camera 56 with digital images of the tanker type aircraft that are retrieved from memory (not shown) based on the received tanker identification code. The imaging processing component 88 determines where the UAV 32 is relative to the tanker 30 (range, azimuth, and elevation). The processor 52 also determines the closure rate of the UAV with the tanker. The processor 52 provides the relative position information to the flight controls 64, which produces flight commands based on position the UAV 32 at a necessary optimum position relative to the tanker 30 for refueling. A non-limiting example of the image processing component 88 determines that the UAV is located too far to one side and too far below the desired position for refueling relative to the tanker. The image processing component 88 can also process information from lights on the bottom of the tanker used to communicate with pilots of the receiving aircraft. These lights are currently used to affect in-flight refuelings in the event that no electronic emission is permitted from the tanker due to security considerations.

The ACAS component 94 receives absolute position information from one or more nearby UAVs 32 or piloted aircraft (not shown) over a wireless data link between the communication components 42b and 55, and generates signals for the flight controls 64 that keep the UAV 32 from colliding with other nearby UAVs 32 or with the tanker 30. A non-limiting example of an ACAS component 94 determines that the UAV 32 has too great a closure rate with the tanker 30, and is at risk of an incipient collision with the tanker 30, such that the ACAS component 94 must send steering commands to the flight controls 64 to maneuver the UAV 32 away from the tanker 30.

Figure 3A:
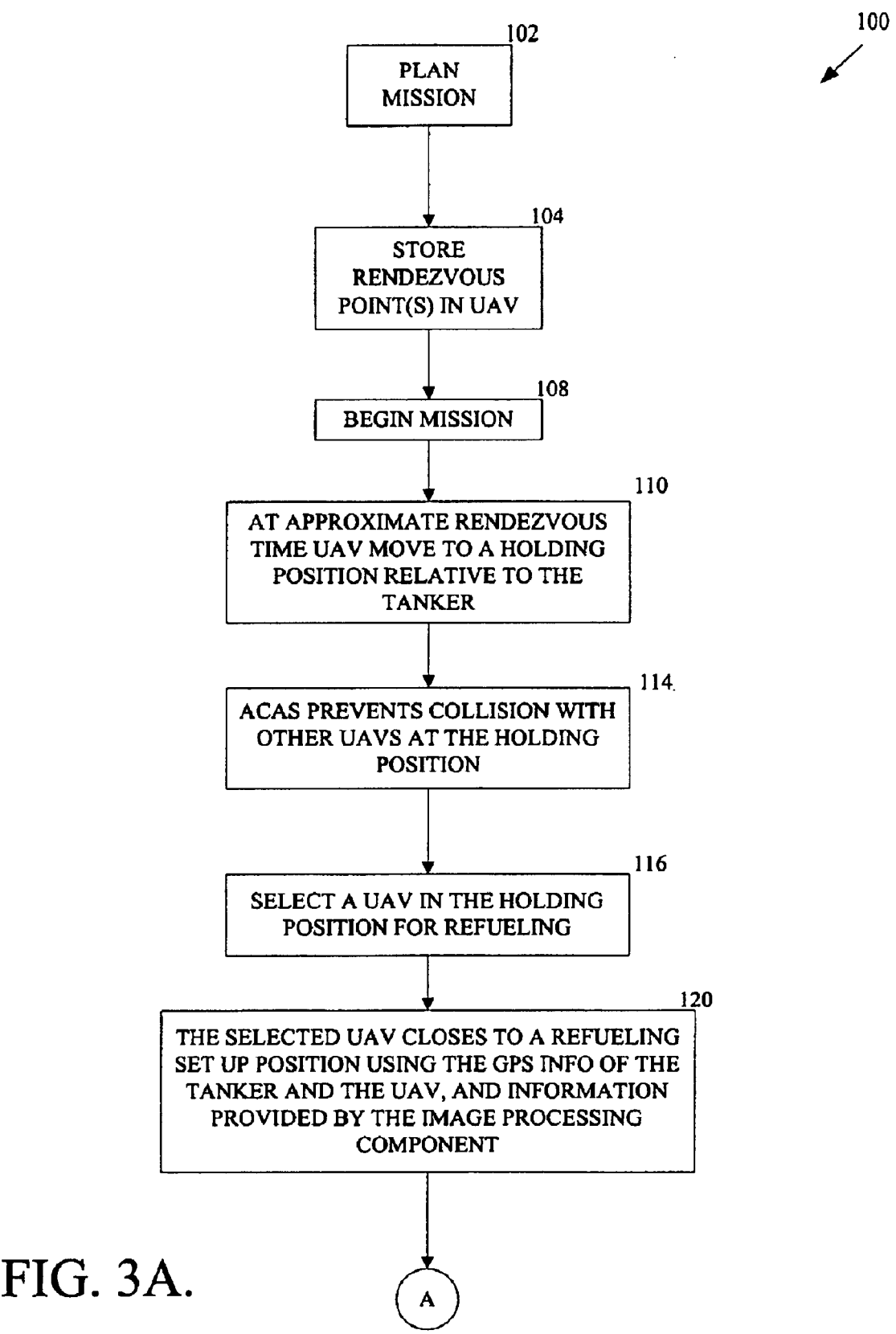
FIGS. 3A–C illustrate a flow diagram of an air refueling operation for a UAV of the present invention.
Figure 3B:
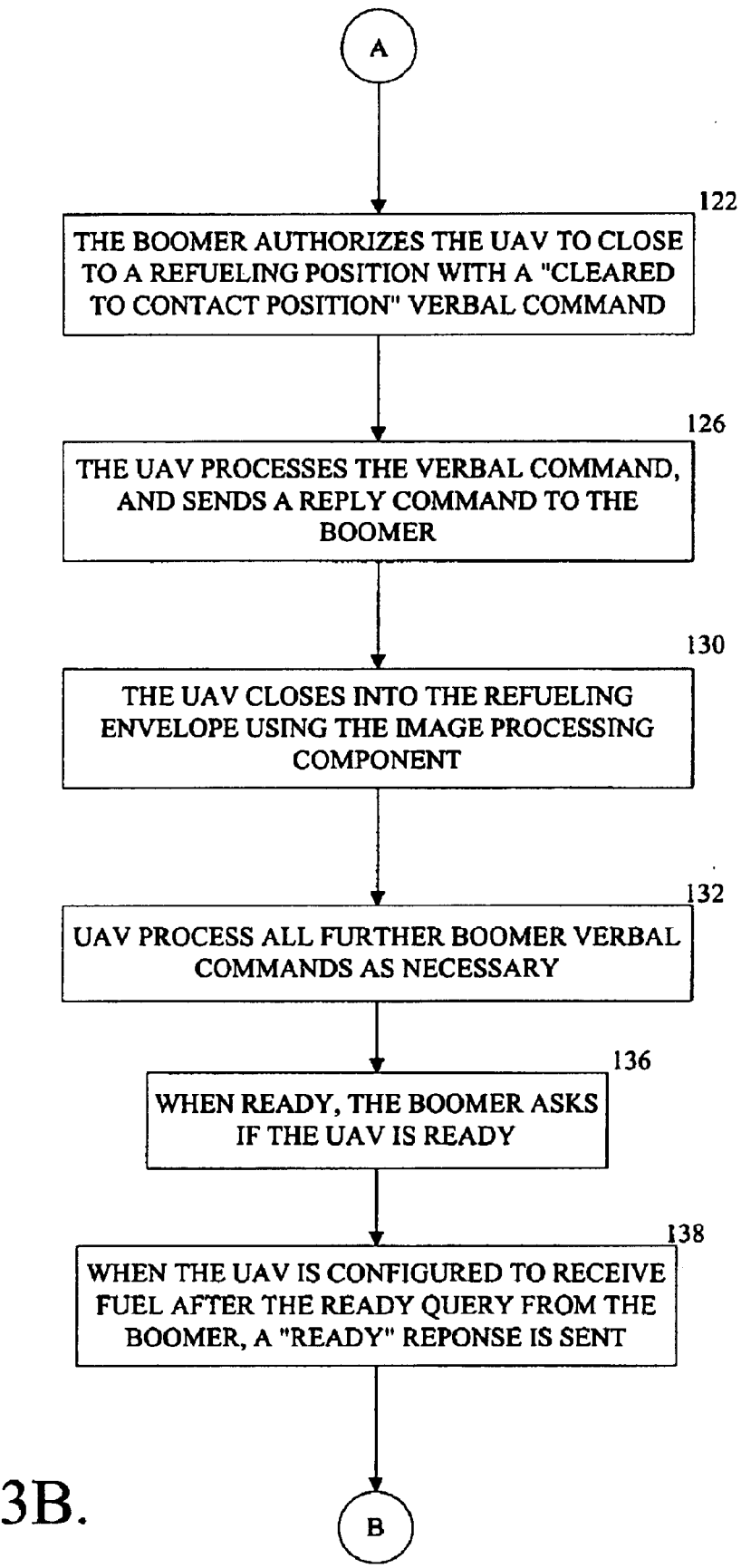
Figure 3C:
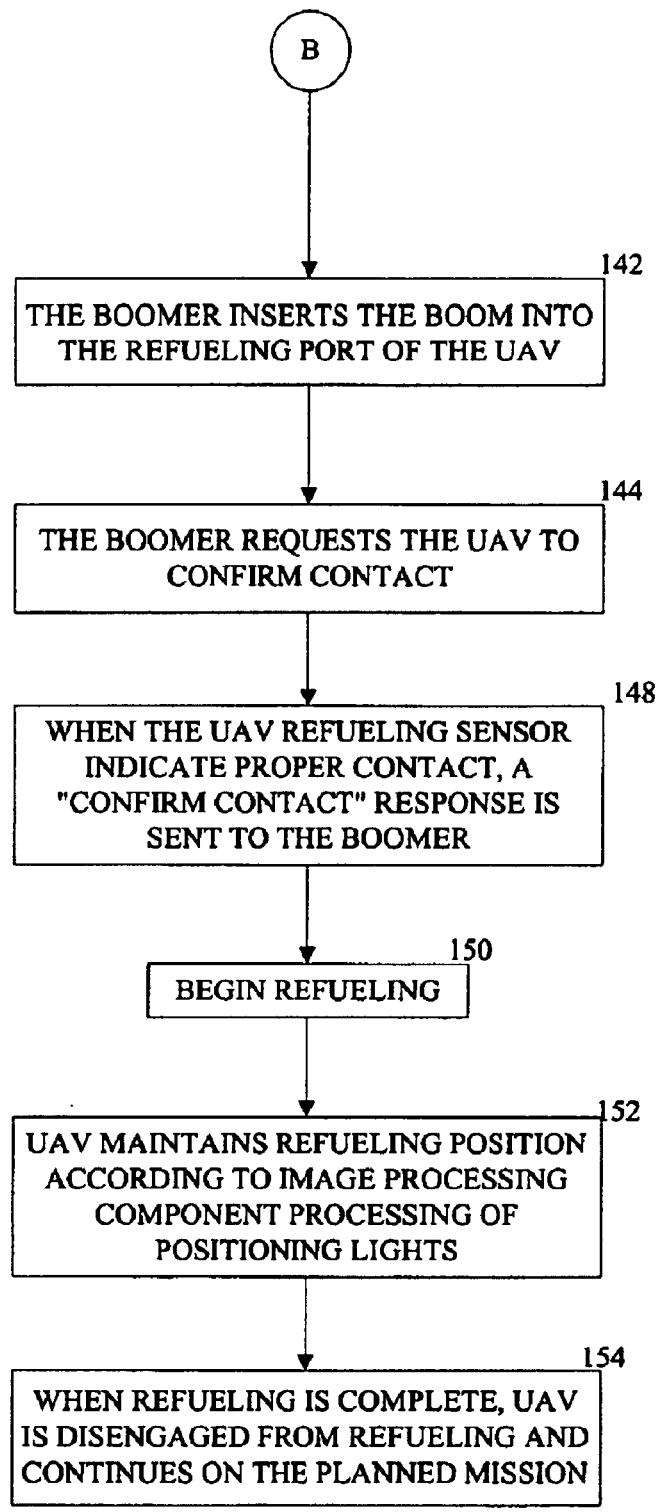

FIGS. 3A-C illustrate an exemplary process performed by the system 20 shown in FIGS. 1 and 2. First, at block 102, a mission is planned and developed. The planned mission includes one or more rendezvous points for refueling of UAV 32. At a block 104, the rendezvous points of the planned mission are stored in the memory component 62 in each of the participating UAVs 32. At a block 108, the mission begins. At a block 110, at about the rendezvous time, the UAV 32 moves into a holding position relative to the tanker 30. Approximately 500 feet aft of the tanker and approximately 100 feet below the tanker is a non-limiting example of a holding position.

During the rendezvous, and throughout the refueling operation, at a block 114, the ACAS component 94 of each of the UAV 32 provides flight control signals for preventing collision with any other UAV 32 at the holding position, or with the tanker 30. At a block 116, a UAV 32 that is in the holding position is selected for refueling. The selection of UAV 32 can be performed by an operator at the ground operation station 34, or an operator on the tanker 30. In an alternate embodiment, the UAVs 32 exchange information about each of their fuel levels over the wireless data link. The UAVs 32 automatically determine which UAV 32 needs to be refueled first according to the lowest amount of fuel, or other considerations as determined from the information exchanged over the data link. At a block 120, the selected UAV 32 closes to a refueling set-up position using flight control (navigation) information determined using the positioning system 42a information of the tanker 30 and the positioning system 58 information of the UAV 32, or flight control information provided by the image processing component 88, or the voice processing component 80.

As shown in FIG. 3B, at a block 122, the boom operator (boomer) authorizes the UAV 32 that is in the refueling set-up position to close to a refueling position. The boomer suitably performs this authorization by providing a verbal command or digital command sent over the wireless data link to the UAV 32 or as an alternative, through voice contact with the ground station operator 34. "Clear to contact position", or an equivalent digital message, is a suitable command provided by the boomer. At a block 126, the UAV 32 processes the verbal command at the voice processing component 80, or at the processor 52 for a digital command, and sends a reply command, such as "Roger, cleared," or its digital equivalent, to the tanker 30. At a block 130, the UAV 32 navigates into the refueling envelope using flight control information suitably provided by the image processing component 88 that is backed up or checked by an analysis of tanker and UAV 32 position information. At block 132, the UAV 32 processes any further verbal commands sent by the boomer as necessary. The following is a non-limiting example of verbal commands provided by the boomer:

"Forward X"
"Up X"
"Back X"
"Down X"
"Left X"
"Right X"
where X=a distance value The UAV 32 sends a repeat of the command back to the boomer/tanker. At a block 136, when the boomer determines that the UAV 32 is in the proper position for refueling, the boomer provides a verbal query asking if the UAV 32 is ready to receive fuel. At a block 138, the UAV 32 receives the query from the boomer, prepares the refueling controls 60, and sends a ready response when the UAV 32 is properly configured to receive fuel.

As shown in FIG. 3C, at a block 142, the boomer inserts the boom into the refueling port of the UAV 32. At a block 144, the boomer verbally or digitally requests the UAV 32 to confirm contact with the boom. At a block 148, in response to the boomer's query request to confirm contact, the UAV 32 checks the refueling sensors to determine if proper contact is indicated. If proper contact is indicated, a "confirmed contact" response is suitably sent to the boomer. At block 150, refueling begins. At block 152, the UAV 32 maintains refueling position according to flight control signals generated by the image processing component 88. In one embodiment, the image processing component 88 receives digital images from the digital camera 56 of the tanker 30. The image processing component 88 generates flight control signals in order to maintain the tanker in a geometric format that places in the UAV 32 in the refueling envelope. At block 154, when refueling is complete, the UAV 32 disengages from the tanker and continues on the planned mission.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. An uninhabited airborne vehicle (UAV) comprising:
    a position component for determining absolute position;
    a memory component for storing flight plan information and one or more images of tanker aircraft;
    an air collision avoidance system (ACAS) component;
    a voice processing component for analyzing;
    a wireless communication component for communicating between a tanker and other UAVs in a predefined vicinity;
    an image processing component; and
    a flight control component.

2. The UAV of claim 1, further comprising refueling components for receiving fuel airborne and refueling sensors for sensing one or more conditions of the refueling components.

3. The UAV of claim 2, wherein the ACAS component receives position information of other aircraft, generates navigation instructions based on the received position information, and sends the generated navigation instructions to the flight control component for the purpose of avoiding collisions with the tanker or the other proximate UAVs.

4. The UAV of claim 3, wherein the voice processing component receives voice instructions over a voice communications channel, analyzes the received voice instructions, transmits a response according to the analysis, generates navigation instructions according to the analysis, and sends the generated navigation instructions to the flight control component.

5. The UAV of claim 4, wherein the voice processing component transmits a response based on the sensed one or more conditions of the refueling components.

6. The UAV of claim 4, wherein the image processing component includes:
    one or more digital cameras for generating one or more digital images;
    a memory; and
    an image processor for comparing the generated one or more digital images to one or more comparable images stored in the memory, generating navigation instructions according to the comparison, and sending the generated navigation instructions to the flight control component.

7. The UAV of claim 6, wherein the flight control component receives position information of at least one of a tanker aircraft or air refueling operation, and navigates according to at least one of the received navigation instructions or the received position information.

8. The UAV of claim 1, further comprising refueling components and a refueling sensor control component for determining status of the refueling components, wherein refueling of the UAV is based on the determined status.

9. A method of navigating an uninhabited airborne vehicle (UAV), the method comprising:
    receiving at the UAV position information for a tanker aircraft;
    analyzing the received position information;
    generating one or more digital images;
    retrieving from memory one or more digital images associated with the generated one or more digital images;
    comparing the generated one or more digital images to the retrieved one or more digital images; and
    navigating according to one or more of the analyzed position information, or the comparison.

10. The method of claim 9, further comprising:
    receiving voice instructions from an operator on the tanker aircraft; and
    analyzing the received voice instructions.

11. The method of claim 10, wherein navigating is further performed according to the analyzed voice instructions.

12. The method of claim 10, further comprising transmitting a response according to the analyzed voice instructions.

13. The method of claim 10, further comprising:
    sensing condition of refueling components of the UAV; and
    transmitting a response according to the analyzed voice instructions and the sensed condition.

14. An air refueling system comprising:
    a tanker; and
    one or more uninhabited airborne vehicles (UAVs) comprising:
        an air collision avoidance system (ACAS) component;
        a voice processing component;
        an image processing component; and
        a flight control component for controlling flight of the UAV based on information provided by one or more of the ACAS component, the voice component, or the image processing component.

15. The system of claim 14, wherein each UAV further includes refueling components for receiving fuel airborne and refueling sensors for sensing one or more conditions of the refueling components.

16. The system of claim 15, wherein the ACAS component receives position information of at least one of other UAVs or the tanker, generates navigation instructions based on the received position information, and sends the generated navigation instructions to the flight control component.

17. The system of claim 16, wherein the voice processing component receives voice instructions from the tanker over a voice communications channel, analyzes the received voice instructions, transmits a response according to the analysis, generates navigation instructions according to the analysis, and sends the generated navigation instructions to the flight control component.

18. The system of claim 17, wherein the voice processing component transmits a response based on the sensed one or more conditions of the refueling components.

19. The system of claim 17, wherein the image processing component includes:

one or more digital cameras for generating one or more digital images;

a memory; and an image processor for comparing the generated one or more digital images to one or more comparable images stored in the memory, generating navigation instructions according to the comparison, and sending the generated navigation instructions to the flight control component.

20. The system of claim 14, wherein the one or more UAVs further comprises refueling components and a refueling controls component for determining status of the refueling components, wherein refueling of the UAVs is based on the determined status.

* * * * *